US005490120A

United States Patent [19]
Li et al.

[11] Patent Number: 5,490,120
[45] Date of Patent: Feb. 6, 1996

[54] METHOD OF IMAGING OVERTURNED WAVES

[75] Inventors: Zhiming Li, Corona; Richard Ottolini, Fullerton, both of Calif.

[73] Assignee: Union Oil Company of California, Los Angeles, Calif.

[21] Appl. No.: 56,314

[22] Filed: Apr. 30, 1993

[51] Int. Cl.$^6$ .............................. G01V 1/28; G01V 1/36
[52] U.S. Cl. .................. 367/53; 367/56; 367/73; 364/421
[58] Field of Search ................. 367/53, 56, 73; 364/421, 422

[56] References Cited

U.S. PATENT DOCUMENTS

| | | | |
|---|---|---|---|
| 4,991,095 | 2/1991 | Swanson | 364/421 |
| 5,138,584 | 8/1992 | Hale | 367/53 |
| 5,235,555 | 8/1993 | Albertin | 367/53 |
| 5,274,605 | 12/1993 | Hill | 367/53 |

OTHER PUBLICATIONS

Etgen, J. T.; 58th Annu Soc. Explor. Geophys. Int. Mtg, Oct. 30, 1988, vol. 2, pp. 909–912; Abst. Only Herewith.
Li, Z.; Geophysics, vol. 52, #3, 1987; Abst. Only Herewith.
"Data Processing of Overturned Reflections," by Zhiming Li, pp. 347–355.
"Imaging Salt with Turning Seismic Waves," by Dave Hale, Colorado School of Mines; N. Ross Hill and Joseph P. Stefani, Chevron Oil Field Research Co., pp. 1171–1174.
"Migrating Reflections Greater than 90 Degress via Depth Extrapolation", by Zhiming Li, Richard Ottoline and Jon F. Claerbout, 54th Annuel Cov. of Explor. Geophysicists, Dec. 2–6, 1984,—Expanded Abstracts.
"Wave–field Extrapolation by the Linearly Transformed Wave Equation," by Zhiming Li, Geophysics, vol. 51, No. 8 (Aug. 1986), Presented at the 55th Annual International Meeting, Society of Exploration Geophysicists, Washington, D.C., pp. 1538–1551.
"Seismic Imaging of Salt Structures in the Gulf of Mexico," by David W. Ratcliff, Samuel H. Gray and Norman D. Whitmore, Seismic Migraton 3: Salt Imaging, Tuesday, Nov. 12, pp. 1164–1167.
"Overturned–wave migraton by two–way extrapolation", Oil Geophysical Prospecting, China, No. 1, vol. 20, pp. 1–8.
"Imaging Steep–Dip Reflections by the Lineasly Transformed Wave Equation Method", by Zhiming Li, Jun. 1986, pp. 1–93. Dissertation submitted to Stanford University.

*Primary Examiner*—Nelson Moskowitz
*Attorney, Agent, or Firm*—William O. Jacobson; Gregory F. Wirzbicki

[57] ABSTRACT

An overturned wave is identified in initial seismic data and revised seismic data gathering parameters are calculated (e.g., a range of locations for a seismic source and detectors laterally displaced from the source). The gathered seismic data is used to image the interface by using an imaging algorithm capable of migrating downgoing and upcoming reflections.

21 Claims, 3 Drawing Sheets

METHOD OF IMAGING OVERTURNED WAVES

FIELD OF THE INVENTION

This invention relates to exploration of subsurface structures by the analysis of seismic data. More specifically, the invention concerns using reflection seismology to determine commercial interest in data which includes overturned waves.

BACKGROUND OF THE INVENTION

Many natural resource industry activities involve exploration for fossil fuel resources, such as oil, within a subterranean zone or formation. A pattern of impressing man-made seismic waves or "shots" is typically used to generate seismic data at different locations at different distances from the zonal interfaces. The collected data from different locations is then typically "stacked" and "migrated" to a single location to image and compare the interfaces and structures in the zone of interest in either 2 or 3 dimensions. The most promising zones of interest may then be further explored and/or natural resources recovered by methods such as drilling and mining.

Distinguishing signals is especially difficult for zones of interest near structures such as a highly fractured zone, a salt dome, or an overturned layer. An overlying salt dome can absorb reflected signals from the zone of interest.

A particularly difficult zone of interest is one containing an overturned interface underneath a salt dome. The salt dome (and the highly faulted region which typically developed on top of the salt dome) may essentially preclude conventional seismic analysis from directly above or proximate to the salt dome. As used herein, an interface capable of generating an overturned wave is typically one having a tangential angle transitioning from less than to greater than 90 degrees from the horizontal within or somewhere near the zone of interest.

It is known that laterally directed seismic reflections can turn towards the surface from the underside of an overturned interface in depth-variable velocity media, e.g., a wave initially reflected laterally downward and away by an overturned interface can be turned and detected at the surface (at some lateral distance away from the overturned interface reflection point) in a media having a seismic wave velocity gradient. In addition, methods to properly locate seismic source(s) and receiver(s) to reliably produce useful data from these overturned interfaces have not been generally available.

SUMMARY OF THE INVENTION

The present invention identifies an overturned wave from initial seismic data (e.g., by using a reverse moveout property of overturned waves), calculates more appropriate locations for the seismic data system design (e.g., the seismic source and detectors are relocated), analyzes the relocated seismic data using a calculated time section (e.g., having a greater delay than conventional methods), and images the interface using an algorithm capable of migrating reflections up to 180 degrees from the horizontal.

The ability to identify and relocate seismic impressing and sensing equipment to image the underside of an interface which generates an overturned wave avoids the potential loss of this image. Avoiding the stacking step also simplifies the analysis process.

BRIEF DESCRIPTION OF THE DRAWINGS

In these Figures, it is to be understood that like reference numerals refer to like elements or features.

DETAILED DESCRIPTION OF THE INVENTION

Figure 1:
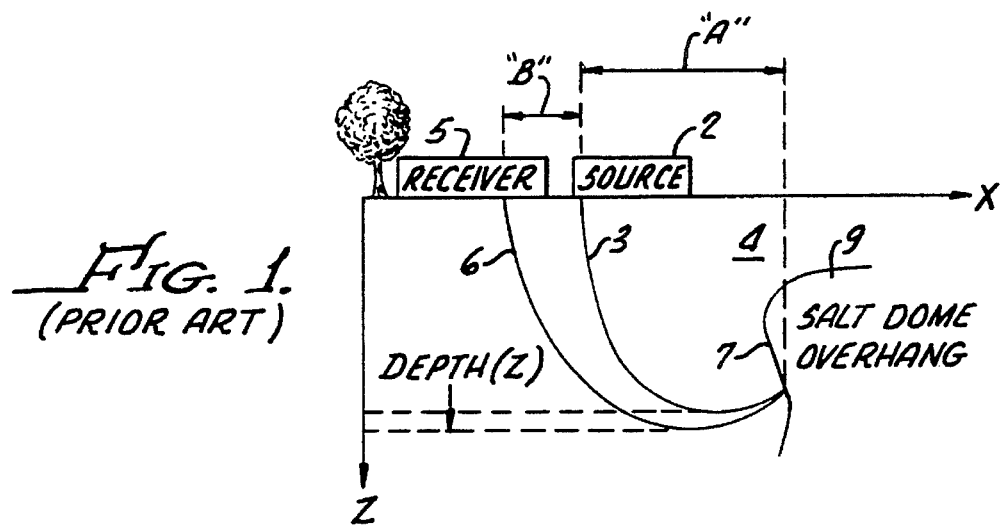
FIG. 1 shows a schematic cross-sectional view of a zone of interest.

FIG. 1 shows a schematic cross-sectional view of a zone of interest where a seismic source 2 is impressing sonic or source waves 3 into a formation 4. A sonic wave detector or receiver 5 obtains seismic data from reflected seismic waves 6 from an overturning interface 7 produced by the interaction between the source waves 3 and the interface 7 which generates the reflected overturned waves 6.

The turning of the impressed seismic waves 3 and the reflected waves 6 is caused by the seismic velocity gradient nature of the underground materials in formation 4. An example of a wave-turning formation is one where a sonic velocity increase is caused by the increasing pressure and density at increasing depth Z.

The lateral or horizontal distance "A" of source 2 with respect to the reflection point on the overturned interface 7, the offset or separation distance "B" between the source 2 and receiver 5, and the time (for selection of a time section) between the source ray or wave 3 initiation and detection of the reflected ray or wave 6 are important variables in obtaining reliable seismic data from the surface 7 generating the reflected wave 6. As the distances "A" and "B" change, the ability to detect reflected waves within a time section will also change. It will be understood by those skilled in the art that the propagated and reflected waves may have far more complex paths than shown in FIG. 1.

Figure 2:
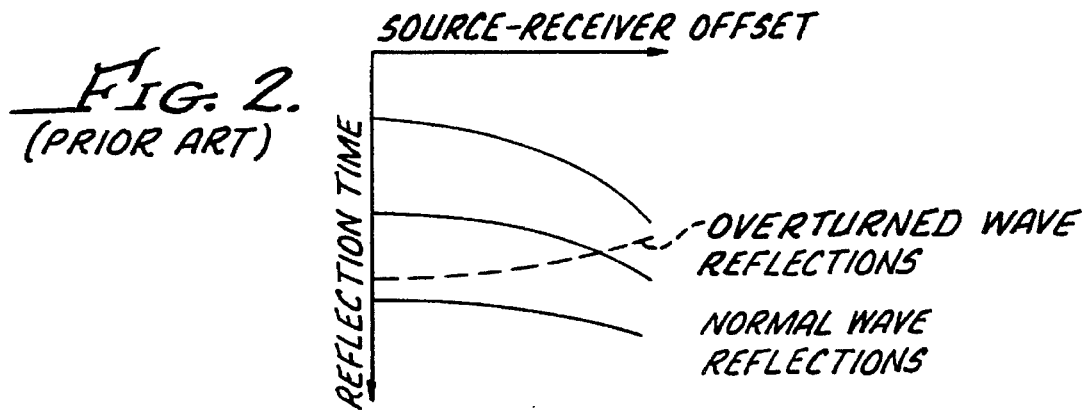
FIG. 2 shows a graph of reflection time from an overturned interface versus offset (distance between receiver and source) on a common-midpoint gather.

In a media or formation 4 where wave velocity varies linearly with depth, i.e., the velocity function v(z) can be written as, $$v(z) = v_o(1 + \beta z) \qquad (1)$$

where $v_o$ is the initial velocity at the surface, $\beta$ is a constant, z is depth, and seismic rays travel along circular arcs, as shown in FIG. 1. If the velocity gradient in the formation 4 is constant, a reverse moveout (RMO) property of overturned waves can be observed as shown in the travel time curves on a common midpoint gather in FIG. 2. A common midpoint gather is a collection of all the seismic traces whose midpoints between source and receiver are at the same surface location. The reverse moveout (RMO) property causes the detection time to decrease as the source to receiver offset distance "B" (as shown in FIG. 1) increases for overturned wave reflections. This is in contrast to conventional or normal seismic wave reflections where an increased separation or source-receiver offset distance "B"

results in an increased detection time.

The RMO property of overturned waves can be used to identify the presence of an overturned interface if the offset distance is varied. The variation is typically accomplished by having a plurality of receivers 5 at different offset distances "B" from a seismic source 2 (see FIG. 1).

Figure 3:
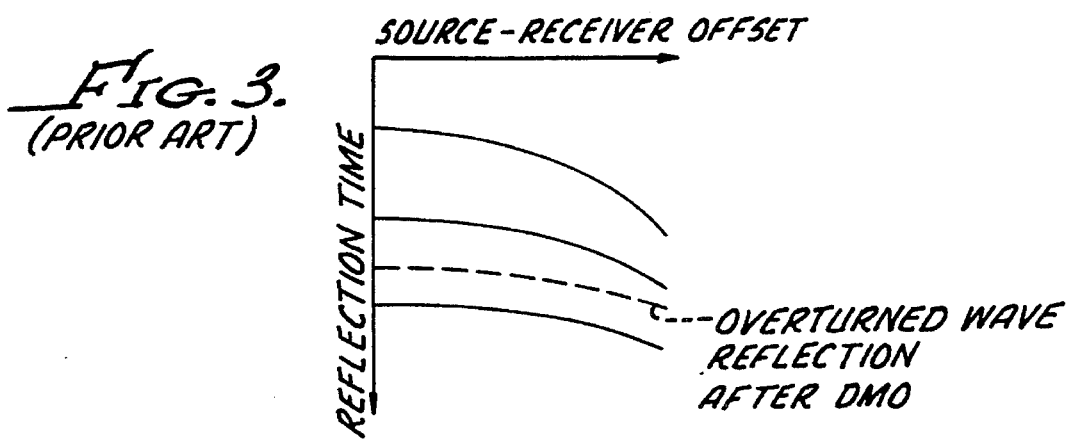
FIG. 3 shows a prior art graph based upon the data shown in FIG. 2 after DMO processing on a common-midpoint gather.

In prior art analysis methods, overturned wave reflections were corrected by a dip moveout algorithm (DMO) process producing dip moveout common midpoint gather as shown in FIG. 3. After DMO processing (and normal moveout processing, if required), stacking of the seismic data from different offsets was done to create a zero-offset (measured) seismogram. Imaging of the zone of interest can then be performed on the stacked, zero-offset seismogram.

The preferred invention analysis method avoids the DMO/stacking/imaging seismogram process, instead using the RMO property to identify an overturned wave (from an overturned interface) using an interactive model and ray tracing program. The program calculates detection times for various source and reflected waves at different locations. When a RMO property is detected, the program's outputs are used to design an improved seismic data acquisition system. Data can be collected and imaged without using the prior art DMO and stacking process.

Figure 4:
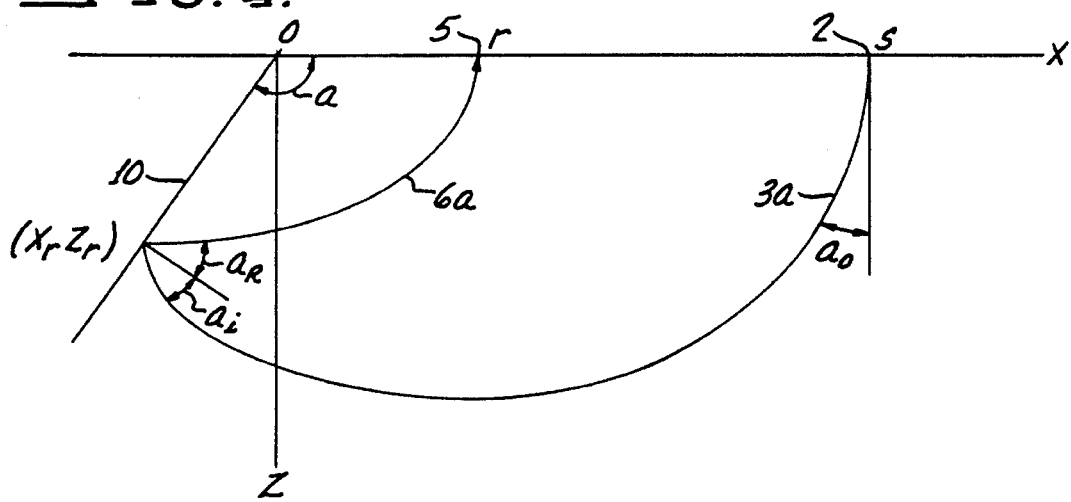
FIG. 4 shows a schematic of a zone of interest.

FIG. 4 shows an idealized cross-sectional view of the relocated seismic data system. Plane 10 is tangent to the overturned interface at a location $(x_r, z_r)$ where the source wave or ray 3a intersects the overturned surface and tangent 10. The tangent 10 intersects the surface at an angle a. The horizontal or lateral (x axis) location of a receiver 5 (at x=r, z=0 coordinates) is closer to the interface reflection location (at $x_r, z_r$) than the impressed wave source 2 (at x=s, z=0). In addition, the relocation can create a reflected ray or wave 6a which is not initially directed downward when compared to FIG. 1 raypaths.

Raypaths may leave and approach the surface (at z=0) at various angles, $a_0$, to the vertical. The raypath and the travel time of a non-reflected ray, before turning point, are given by, $$x = s + \frac{1}{v_0 \beta_p} \left( \sqrt{1 - (pv_0)^2} - \sqrt{-1 - (pv(z))^2} \right)$$

$$t = \frac{1}{v_0 \beta} \ln \left( \frac{(1 + \beta z)(1 + \sqrt{1 - (pv_0)^2})}{1 + \sqrt{1 - (pv(z))^2}} \right) \quad (2)$$

while the raypath and the travel time of a non-reflected ray, after turning point, are given by, $$x = s + \frac{1}{v_0 \beta_p} \left( \sqrt{1 - (pv_0)^2} + \sqrt{1 - (pv(z))^2} \right)$$

$$t = \frac{1}{v_0 \beta} \ln \left( \frac{(1 + \sqrt{1 - (pv_0)^2})(1 + \sqrt{1 - (pv(z))^2})}{p^2 v_0 v(z)} \right) \quad (3)$$

Given ray parameters, $p = \sin(a_z)/v(z) = \sin(a_0)/v_0$, positions (x, z) and travel times, t, of the rays with propagation angles less than 90 degrees are given by equation (2), while positions and travel times of the rays with propagation angles greater than 90 degrees (overturned waves) are given by equation (3). The reflection point $(x_r, z_r)$ for a given source ray parameter, p, is given by the following equation, $$\left\{ \left( \frac{z_r}{\tan(a)} - s \right) v_0 \beta_p - \sqrt{1 - (pv_0)^2} \right\}^2 = 1 - (pv_0(1 + \beta z_r))^2 \quad (4)$$

$$x_r = \frac{z_r}{\tan(a)}$$

The propagation angle (measured from vertical) of the reflected ray at $(x_r, z_r)$ is given by, $$a_r = \pi - 2a - a_i \quad (5)$$

where $a_i$ is the propagation angle of the incident ray at $(x_r, z_r)$, and all angles are in radians.

Figure 5:
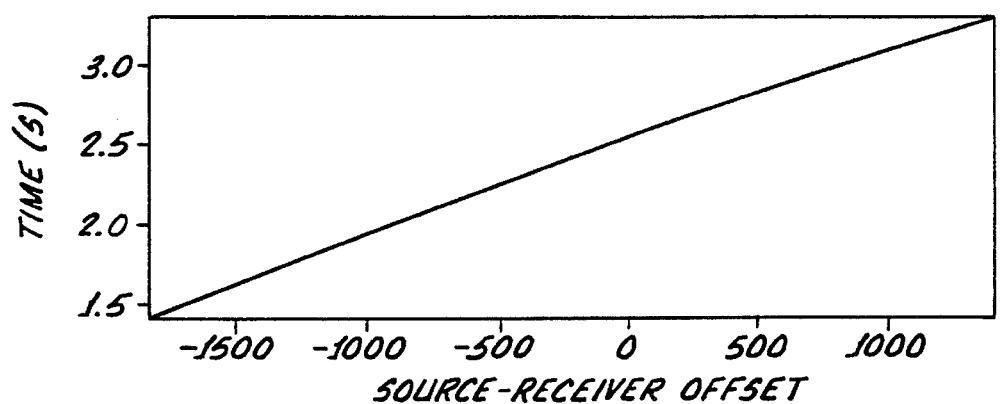
FIG. 5 shows a graph of travel time versus offset distance.
Figure 6:
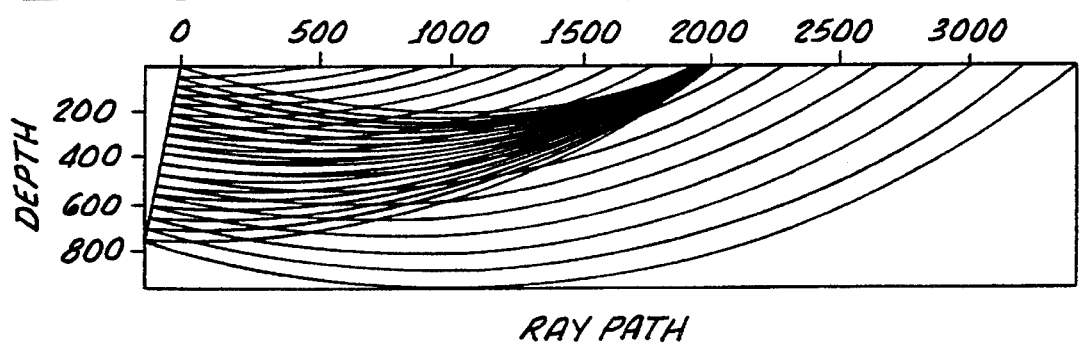
FIG. 6 shows a graph of ray paths from a source over various depths and distances.

Equations (2) to (5) form the basis for an interactive modeling program which allows users to specify a seismic velocity function, a dip or angle of a reflector interface, and a source location to obtain seismic system design parameters such as receiver offsets and cable lengths to compute ray paths and travel times of overturned reflections. An example of a graph of calculated ray paths and travel times is shown in FIG. 5.

The output of the interactive model program allows the seismic acquisition system to be redesigned, e.g., the source and receivers to be placed and the recorded time selected for optimum sensing and imaging of overturned waves. Based upon equations (2) through (5), the interactive program calculates cable locations and offsets, the length of cable needed, and the maximum reflection time needed for given reflector depth, reflector dip, source location, and velocity function.

Table 1 lists some examples of computed seismic acquisition requirements for collecting overturned reflections using the interactive program based upon these equations. For these examples, a linear velocity gradient relationship to depth, z, was specified to range from 0.3 meters per second per meter of depth ((m/s)/m) to 1.0 ((m/s)/m), the depth of the reflection location ranged from 1000 to 3000 meters, and the angle of the reflector, a, ranged from 100 to 120 degrees. These resulted in $of_{min}$ and $of_{max}$ (the minimum and maximum offsets, respectively) ranging from 239.9 meters to 36354.8 meters and $t_{max}$ (the maximum record time from source initiation to detection for recording the overturned waves within a time section) ranging from 5.21 seconds to 12.00 seconds. Table 1 generally shows that the smaller the velocity gradient and the larger the dip of the reflector, the larger cable length, the longer offsets and the longer record time are required.

Figure 7:
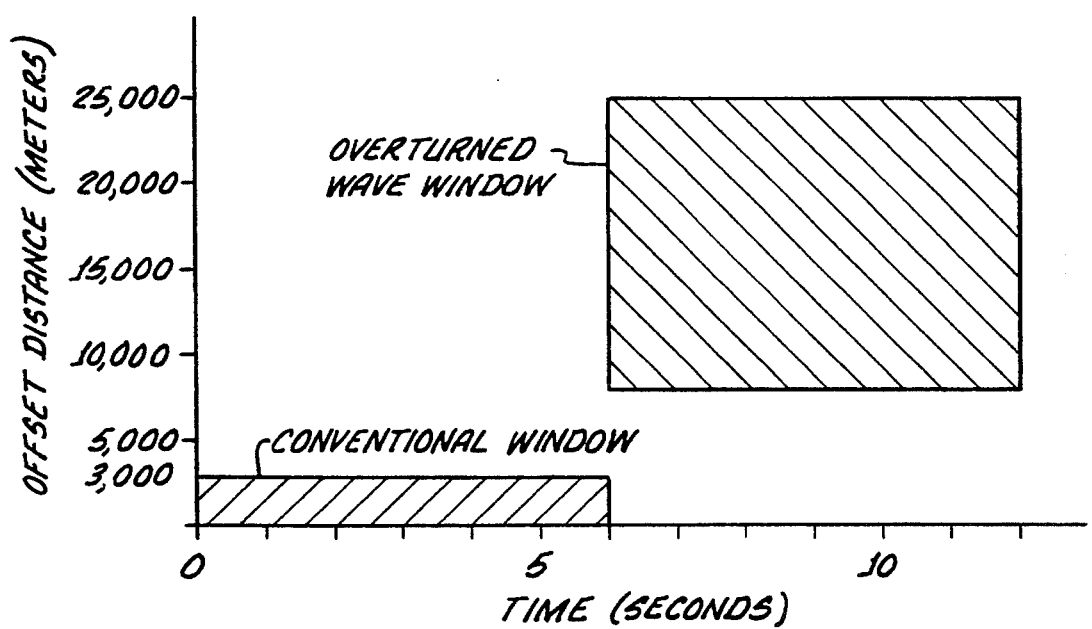
FIG. 7 shows a sample offset distance versus time seismic data collection chart.

FIG. 7 shows a typical conventional seismic data window and a typical window for overturned wave seismic data from a single seismic source. Although the window is dependant upon site variables such as seismic velocity, a typical conventional window of seismic data stops collecting data after 6 seconds and the receivers are offset from the seismic source by no more than 3000 meters. This conventional window can be contrasted with a typical overturned wave window, which may begin after the conventional window and collects data from receivers offset by larger distances. In other examples, the time/offset conventional and overturned wave windows may overlap or be further separated.

A time section is selected around the $t_{max}$ times calculated in order to capture overturned wave reflections. For example, for a calculated $t_{max}$ of about 5 seconds, a time section might range from about 2 to about 5 seconds. Similarly for a calculated $t_{max}$ of 20 seconds, a time section might range from about 10 to about 20 seconds. Typically, the time section would range from about half the calculated $t_{max}$ time to about the calculated $t_{max}$, for example the time section for a calculated $t_{max}$ of 12 seconds would typically start 6 seconds after impressing the seismic wave and last for about 6 seconds.

TABLE 1

Data Acquisition System Geometry

| v (z) (m/s) | a (degrees) | s (m) | $of_{min}$ (m) | $of_{max}$ (m) | $t_{max}$ (s) |
|---|---|---|---|---|---|
| 1600 + 0.6 z | 100 | 2000 | 2669.4 | 13143.5 | 6.50 |
| 1600 + 0.6 z | 100 | 3000 | 239.9 | 7358.8 | 5.80 |
| 1600 + 0.6 z | 120 | 2000 | 10342.2 | 36354.8 | 9.75 |
| 1600 + 0.3 z | 100 | 2000 | 7766.4 | 25978.5 | 12.00 |
| 1600 + 1.0 z | 120 | 3000 | 1028.5 | 9355.3 | 5.21 |

For other interface and overturned wave conditions, the minimum and maximum offset distance between the seismic source and receiver (see distance B in FIG. 1) is expected to be different. Although the maximum offset distance is theoretically unlimited, practical considerations are expected to limit the maximum offset distance to no more than about 15,000 meters, more typically no more than about 5,000 meters. The minimum lateral offset distance between the source and receiver is zero.

Besides helping field seismic source and receiver design and selecting recording times, the interactive overturned wave ray tracing program using the analytic expressions (equations 2–5) also provides the ray directional information needed in processing and imaging of overturned waves. Conventional methods image one-way (upcoming) propagating reflections with a propagation angle less than 90 degrees. To image overturned reflections that are beyond 90 degrees, imaging algorithms must be able to handle both upcoming and downgoing waves, e.g., a two pass phase-shift method.

A preferred two-pass phase-shift method to image overturned reflections in the vertically-varying velocity media is summarized as follows, 1. 2D fft of input stack $P(t,x) \rightarrow P(f,k_x)$
2. apply phase-shift operator $\exp(-ik_z dz)$ to downward extrapolate $P(f,k_x)$ with a depth step dz, obtain normal reflection image and save overturned energy $P_o(f,k_x,z)$
3. repeat step 2 from z=0 to $z=z_{max}$
4. apply phase-shift operator $\exp(-ik_z dz)$ to upward extrapolate $P_o(f,k_x,z)$ with a depth step dz, obtain overturned reflection image and add $P_o(f,k_x,z-dz)$ to $P_o(f,k_x, z)$
5. repeat step 4 from $z=z_{max}$ to z=0 where P is the wavefield motion, t is time, x is horizontal distance, f is frequency, $k_x$ is horizontal wave number, $k_z$ is vertical wave number, $z_{max}$ is the maximum depth of imaging. This method is valid for zero-offset or stacked data and in media with vertically-varying velocity.

In a formation or media with both lateral and vertical velocity variations, a finite-difference method is needed to image overturned reflections. The finite-difference method used applies a linear transform to the wave equation so that the wave extrapolation can be done along the characteristic lines of wave propagation. This linearly transformed wave equation (LITWEQ) method has the advantage of less numerical dispersion than the same order, conventional finite-difference methods. The LITWEQ method for post-stack imaging is summarized as follows, 1. input post-stack data P(t,x,z=0)
2. LITWEQ extrapolates wave field along the characteristics $(t_1, t_2)$
3. obtained image at t=0 where $t_1$ and $t_2$ are given by, $$\begin{bmatrix} t_1 \\ t_2 \end{bmatrix} = \begin{bmatrix} \frac{1}{\sqrt{2}} & \frac{1}{\sqrt{2}} \\ \frac{1}{\sqrt{2}} & -\frac{1}{\sqrt{2}} \end{bmatrix} \begin{bmatrix} \tau \\ t \end{bmatrix} \quad (6)$$

$$\tau = \int_0^z \frac{dz}{v} \quad (7)$$

Once the overturned reflections are identified on the seismograms, imaging can also be accomplished without stacking (i.e., pre-stack imaging). For pre-stack imaging, the LITWEQ method can be summarized as follows, 1. forward modeling wave field using LITWEQ modeling scheme
2. backward extrapolation of shot gather
3. apply imaging condition (e.g., dot product) to the forward modeled and backward extrapolated wave fields to obtain pre-stack image
4. repeat steps 1, 2, 3 for all input shot gathers
5. sum partial images from different shot gathers to obtain a final image section The pre-stack method provides a method of imaging in the absence of stacking. This avoids the potential for errors in stacking phase-shifted data and may simplify the imaging calculations.

While the preferred embodiment of the invention has been shown and described, and some alternative embodiments also shown and/or described, changes and modifications may be made thereto without departing from the invention. Accordingly, it is intended to embrace within the invention all such changes, modifications and alternative embodiments as fall within the spirit and scope of the appended claims.

What is claimed is:

1. A method for imaging an underground interface in a zone within a variable seismic velocity media where a natural resource may be located, wherein said interface is oriented such that an overturned wave is generated by an impressed seismic motion, said method comprising:

impressing one or more seismic motions from a seismic source into said media beginning at time $t_0$;

detecting a set of reflected seismic motions from said interface at a plurality of detector locations, at least one of said detectors located at an offset distance from said source, wherein said detectors and seismic source form a seismic system producing seismic data containing said overturned wave; and imaging said underground interface using said seismic data and a linearly transformed wave equation in the absence of a data stacking step otherwise migrating said seismic data.

2. The method of claim 1 which also comprises:

identifying overturned waves reflected from said underground interface in said seismic data prior to said imaging step; and recovering said natural resource based at least in part upon said imaging, wherein said detecting is accomplished overturned waves are detected over a period of time which begins after $t_0$ plus 2 seconds.

3. A method for imaging an underground interface in a zone within a variable seismic velocity media where a natural resource may be located, wherein said interface is oriented such that an overturned wave is generated by an impressed seismic motion, said method comprising:

impressing one or more seismic motions from a seismic source into said media beginning at time $t_0$;

detecting a set of reflected seismic motions from said interface at a plurality of detector locations, at least one of said detectors located at an offset distance from said source, wherein said detectors and seismic source form a seismic system producing seismic data;

imaging said underground interface using said seismic data and a linearly transformed wave equation without a data stacking step;

identifying overturned waves reflected from said underground interface in said seismic data prior to said imaging step;

recovering said natural resource based at least in part upon said imaging, wherein at least a portion of said detecting is accomplished over a period of time which begins after $t_0$ plus 2 seconds; and after the identifying step and before the imaging step, also comprises the steps of:

calculating receiver and source locations, a second offset distance, and a second period of time based at least in part on said seismic data;

relocating said seismic system to the calculated locations;

second impressing one or more seismic motions from a seismic source; and detecting a second set of reflected wave data at one or more relocated detectors over a second period of time.

4. The method of claim 3 wherein said second offset distance is 239 meters or more.

5. The method of claim 4 wherein said second offset distance is no more than 5000 meters.

6. The method of claim 5 wherein said second period of time is terminated no more than 20 seconds after $t_0$.

7. A method for imaging an underground interface in a zone where a natural resource may be located, wherein a tangent to said interface is oriented such that an overturned wave is generated when a seismic motion is impressed into said zone, said method comprising:

impressing one or more seismic motions from a seismic source into said zone beginning at $t_0$;

detecting a first set of reflected seismic motions from said interface at a plurality of detector locations, one of said detectors located at an offset distance from said source, wherein said detectors and seismic source form a seismic system producing seismic data and detecting is accomplished over a time section;

identifying overturned waves reflected from said underground interface in said seismic data;

calculating a second offset distance and second locations for the elements of said seismic system, and a second time section based at least in part on said seismic data;

relocating said seismic system to the calculated second locations;

impressing one or more seismic motions from a seismic source;

detecting a second set of reflected seismic data at one or more relocated detectors over a second time section;

imaging said underground interface based at least in part on said second set of reflected data; and recovering said natural resource based at least in part upon said imaging.

8. The method of claim 7 wherein said imaging uses a two pass algorithm in conjunction with a data stacking step.

9. The method of claim 8 wherein said second time section extends 6.5 seconds after $t_0$ or longer.

10. The method of claim 9 wherein said two-pass algorithm based method comprises the steps of a. 2D fft of input stack $P(t,x) \rightarrow P(f,k_x)$ b. apply phase-shift operator $\exp(-ik_z dz)$ to downward extrapolate $P(f,k_x)$ with a depth step $dz$, obtain normal reflection image and save overturned energy $P_o(f,k_x,z)$ c. repeat step b from $z=0$ to $z=z_{max}$ d. apply phase-shift operator $\exp(-ik_z dz)$ to upward extrapolate $P_o(f,k_x,z)$ with a depth step $dz$, obtain overturned reflection image and add $P_o(f,k_x,z-dz)$ to $P_o(f,k_x,z)$ e. repeat step d. from $z=z_{max}$ to $z=0$.

11. A method for imaging an underground interface in a zone where a natural resource may be located, wherein said interface is oriented such that an overturned wave is generated when a seismic motion is impressed into said zone, said method comprising:

impressing one or more seismic motions from a seismic source into said zone beginning at $t_0$;

detecting a set of reflected seismic motions from said interface at a plurality of detector locations, one of said detectors located at an offset distance from said source, wherein said detectors and seismic source form a seismic system producing seismic data and detecting is accomplished over a time section;

identifying overturned waves reflected from said underground interface in said seismic data;

calculating overturned wave raypath and travel times using an interactive modeling program;

relocating at least a portion of said seismic system such that said detector is offset a second offset distance from said seismic source;

impressing a second seismic motion at a second $t_0$ and detecting a second set of reflected seismic motions forming a second data set, wherein said detecting is accomplished over a second time section extending 6 seconds or more after $t_0$;

imaging said underground interface using a linearly transformed wave equation based method in the absence of a data stacking step; and recovering said natural resource based at least in part upon said imaging.

12. The method of claim 11 wherein said first offset distance is 239 meters or more.

13. The method of claim 12 wherein said first offset distance is no more than 3000 meters.

14. The method of claim 13 wherein said second time section is terminated no more than 12 seconds after $t_0$.

15. The method of claim 14 wherein said identifying step uses at least in part the reverse moveout property of overturned waves.

16. The method of claim 15 wherein said imaging also comprises:

a. forward modeling said second data set using a linearly transformed wave equation;

b. backward extrapolation of a portion of said second data set;

c. applying a dot product to the forward modeled and backward extrapolated wavefields to obtain a partial image;

d. repeat steps a through c for the remaining portions of said second data set; and e. sum partial images from steps c and d to obtain a final image.

17. A seismic source and receiver apparatus for imaging an overturned interface within an underground formation having a variable seismic velocity, said apparatus comprising:

a source of impressing a seismic wave into said media capable of reaching said overturned interface;

at least one receiver of reflected wave data from said overturned interface, wherein said receiver is offset 239 meters or more from said source; and means for imaging said interface from said wave data without a stacking step.

18. The apparatus of claim 17 wherein said receiver also comprises means for detecting reflected wave data over a time section beginning at least 3 seconds after said seismic wave is impressed.

19. The apparatus of claim 18 which also comprises an interactive means for calculating a raypath and a travel time from said seismic data.

20. The apparatus of claim 19 which also comprises a means for repositioning said receiver based at least in part upon said calculated raypath and travel time.

21. An seismic source and receiver apparatus for imaging an interface capable of generating overturned waves within an underground formation having a variable seismic velocity, said apparatus comprising:

a source of a seismic wave capable of reaching said interface;

at least one detector located at an offset distance from said source forming a seismic system, said detector capable of detecting reflected seismic waves from said overturned interface after said source impresses said seismic wave;

means for interactively calculating a raypath and a travel time of seismic waves from various locations of said source and to various locations of said detector;

means for relocating said seismic system based at least in part on said raypath and travel time calculations; and means for imaging said interface based upon at least in part on seismic data from said relocated seismic system.

* * * * *